United States Patent [19]

Agarwala

[11] Patent Number: 5,126,317
[45] Date of Patent: Jun. 30, 1992

[54] BEARING SYSTEM EMPLOYING A SUPERCONDUCTOR ELEMENT

[75] Inventor: Ashok K. Agarwala, Penfield, N.Y.

[73] Assignee: Eastman Kodak Company, Rochester, N.Y.

[21] Appl. No.: 251,626

[22] Filed: Sep. 30, 1988

[51] Int. Cl.$^5$ .......................................... H01B 12/00
[52] U.S. Cl. ...................................... 505/1; 505/700; 310/52; 310/90.5; 335/216
[58] Field of Search ...................... 310/90.5, 40 R, 10, 310/52, 268, 156; 505/700, 702, 706, 1, 775; 335/216; 336/DIG. 1

[56] References Cited

U.S. PATENT DOCUMENTS

| | | | |
|---|---|---|---|
| 3,026,151 | 3/1962 | Buchhold | 310/90.5 |
| 3,233,950 | 2/1966 | Baermann | 310/90.5 |
| 3,493,274 | 2/1970 | Emslie | 310/90.5 |
| 3,899,223 | 8/1975 | Baermann | 310/90.5 |
| 4,128,280 | 12/1978 | Purtschert | 310/90.5 |
| 4,444,444 | 4/1984 | Benedetti | 310/90.5 |
| 4,797,386 | 1/1989 | Gyorgy | 335/216 |
| 4,886,778 | 12/1989 | Moon | 310/90.5 |

FOREIGN PATENT DOCUMENTS 1283946 11/1968 Fed. Rep. of Germany ..... 310/90.5

OTHER PUBLICATIONS

Principles of Superconductive Devices and Circuits by T. W. Duzer et al.; Elsevier, New York; 1976; pp. 271–274, 306–309.
J. Appl. Physics 55 by M. Sagawa et al.; Mar., 1984, pp. 2083–2087.
IEEE Transactions on Magnets MAG-1 by J. J. Croat; 1982; pp. 1442–1447.
"Superconductor World Report"; vol. 1/No. 1; Dec. 1987.
"Advanced Ceramic Materials"; vol. 2/No. 3B; Jul. 1987; American Ceramic Society.

Primary Examiner—R. Skudy
Attorney, Agent, or Firm—Stephen C. Kaufman

[57] ABSTRACT

A bearing system that includes a superconductor bearing and a magnetic rotor that can carry a load. The bearing system exploits the Meissner effect to levitate the magnetic rotor. The magnetic rotor can rotate or translate with respect to the superconductor bearing in response to an applied external force or torque. Advantages of the bearing system are that a coefficient of friction developed in the interface between the superconductor bearing and the magnetic rotor is approximately zero, and the bearing system may be used for vibration isolation and non-mechanical coupling.

13 Claims, 7 Drawing Sheets

PROCESS FLOWCHART FOR OXIDE SUPERCONDUCTOR
POWDER PREPARATION COPRECIPITATED PRECURSOR

BEARING SYSTEM EMPLOYING A SUPERCONDUCTOR ELEMENT

CROSS-REFERENCE TO A RELATED APPLICATION

This application is related to a copending and commonly assigned patent application Ser. No. 07/251,621 filed Sept. 30, 1988 to Agarwala, now U.S. Pat. No. 4,892,863 which is being filed contemporaneously with this application. The entire disclosure of this copending application is incorporated by reference herein.

BACKGROUND OF THE INVENTION

1. Field of the Invention

This invention relates to bearing systems.

2. Introduction to the Invention

A conventional bearing system may include a bearing, and a rotor that can carry a load. The rotor-load may rotate, slide or oscillate with respect to the bearing, or vice versa. The bearing system includes an interface defined by the bearing and rotor. It is one important objective of a bearing system to minimize a coefficient of friction developed in the interface defined by the bearing and rotor. In this way, bearing life may be lengthened, and the bearing system can maintain a desired operating capability. At the same time, it is an objective to constrain the motion of the rotor with respect to the bearing, in a desired direction, and maintain an adequate bearing system stability.

SUMMARY OF THE INVENTION

For a conventional bearing system, the coefficient of friction varies appreciably with the type of bearing, for example, journal bearings, thrust bearings or guide bearings, and load, speed, lubrication and sealing element. For rough calculations, for example, the following coefficients of friction are typical for normal operating conditions and favorable lubrication:
Single-row ball bearings ... 0.0015
Roller bearings ... 0.0018.

In general, the coefficient of friction may vary from approximately 0.0015 to 0.40, the higher boundary defining a complete failure of lubrication.

I have now discovered a new way of utilizing superconducting materials and magnets to construct a bearing system that is essentially frictionless, i.e., the coefficient of friction is much less than the above-mentioned values. The new bearing system comprises
  a) a superconductor bearing; and
  b) a magnetic rotor that can be positioned so that it can levitate and move with respect to the bearing, and wherein a magnetic field developed between the bearing and the rotor when the rotor is levitated is such that: a variation in the magnetic field in the direction of movement of the rotor is a relative minimum, as sensed by the bearing, and a variation in the magnetic field in all other directions is relatively greater than this minimum, as sensed by the bearing.

In another aspect, the present invention comprises a bearing system, which system comprises:
  a) a superconductor bearing comprising a Y-Ba-Cu oxide composition; and
  b) a magnetic rotor that can be positioned so that it can levitate and move with respect to the bearing, and comprising at least two pole-pairs.

The bearing system as defined has many uses and provides exceptional advantages over the known conventional bearing systems. This is true for the following reasons. The invention exploits the Meissner effect: that is, there is an induced repulsive force field or expulsion field developed between the superconductor bearing and the magnetic rotor. This, in turn, in conjunction with the magnetic field variations as defined above, can be used to provide extremely stable levitation of the magnetic rotor with respect to the superconductor bearing, even at very high rotational speeds of the rotor, for example, rotational speeds of at least 300,000 rpm. Moreover, the magnetic field developed between the superconductor bearing and the magnetic rotor in the direction of movement of the rotor helps provide a bearing system that is essentially frictionless, i.e., the coefficient of friction developed in the interface defined by the superconductor bearing and the magnetic rotor is approximately zero. I have found that my bearing system can realize both very low rotational noise, and nearly zero transmission of external vibrations. At the same time, the bearing system can exhibit at least one degree of freedom. This makes my bearing system particularly useful, for example, in such disparate fields as:
  (1) Gimballing
  (2) Precision pointing
  (3) Vibration isolation e.g., of optical elements or platforms
  (4) Linear or angular actuators for micropositioning
  (5) High-speed rotating machinery including gyros, momentum wheels and brushless DC motors.

As summarized above, the magnetic rotor may be positioned so that it can levitate and move with respect to the superconductor bearing (or vice versa). The movement can be translational or rotational or both. The movement may be induced by way of external forces or torques.

Preferred embodiments of the magnetic rotor include using a magnetic rotor with an appropriately patterned magnetic pole configuration. For example, in one aspect of the invention, the magnetic rotor preferably comprises an n pole-pair configuration, where n is at least two. Preferably, the magnetic rotor is in the form of a "pie-shaped" disc, so that n pole-pair pie wedges can be defined having alternating opposite north-south magnetizations. Again, for example, the magnetic rotor may be in the form of a rectangle, with longitudinally parallel, rectangular pole-pair strips or columns in the magnetic rotor having alternating opposite north-south magnetizations. As another example, the magnetic rotor may be in the form of a ring having concentric, alternating opposite north south magnetizations.

In operation, the bearing system, by way of the magnetic rotor, can impart movement to a load. The movement of the rotor-load may be understood by an application of force equations or torque equations. For example, the bearing system, viewed as a mechanical rotational system, may be referenced in the following way:
  (1) Rotor/load mass (moment of Inertia J).
  (2) Applied Torque To Rotor/Load (T), induced by varying magnetic field.
  (3) Elastance or stiffness K of the Rotor/Load Mass, which can provide a restoring force (analogous to a spring) to the Applied Torque.

In general, the stiffness K of the bearing system is experienced in the movement of the magnetic rotor levitating on the superconductor bearing. The stiffness K may be determined by the material and microstructural properties of the superconductor bearing, as well as the magnetic pole pattern imparted to the magnetic rotor. In particular, it has been theorized that the stiffness is associated with the fact that the superconductor bearing does not simply repel the magnetic rotor (the Meissner Effect), but actually pins the magnetic field lines developed in the superconductor owing to a partial penetration of the magnetic flux, so as to "cradle" the magnetic rotor to the superconductor bearing. This cradling action, in turn, corresponds to the stiffness of the bearing system.

BRIEF DESCRIPTION OF THE DRAWINGS

The invention is illustrated in the accompanying drawings in which.

DETAILED DESCRIPTION OF THE INVENTION

Figure 1:
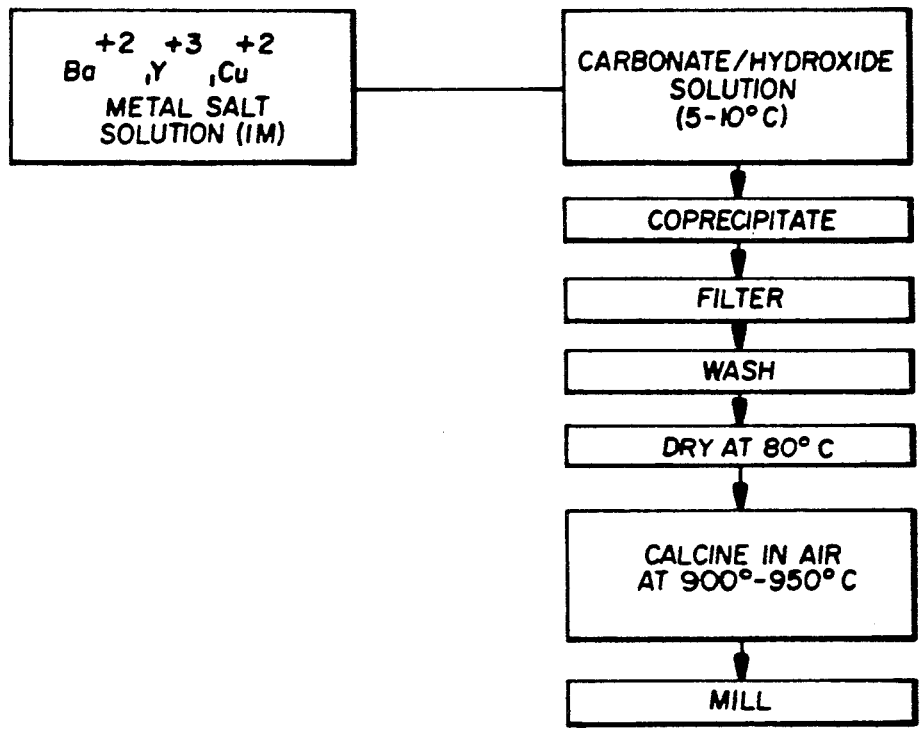
FIG. 1 shows a process flowchart for preparation of a superconductor bearing.
Figure 2A:
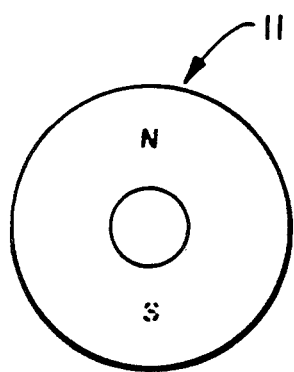
FIGS. 2A-D show four magnetic rotors that may be used in different embodiments of the invention.
Figure 2B:
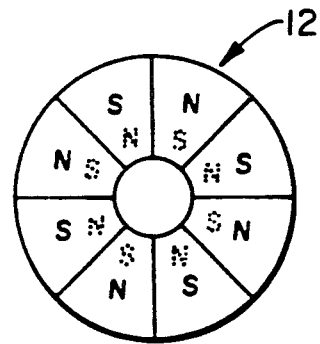
Figure 2C:
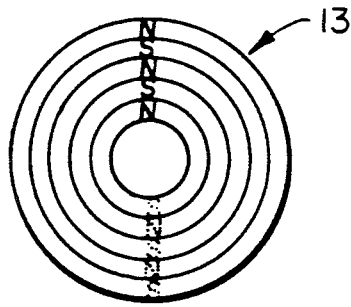
Figure 2D:
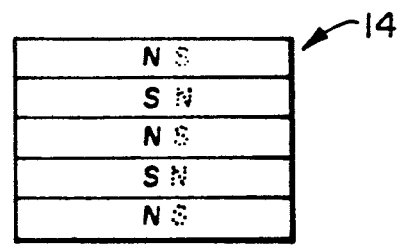

I now turn to preferred aspects of the bearing system of the present invention.

The superconductor bearing may comprise a type I material or a type II material. The type I material can make a direct magnetic transition from the superconducting Meissner state to a normal state, denoted by a critical phase transition magnetization field $H_c$. The type I superconductor is able to completely expel an applied magnetic field H from its interior, as long as H is smaller than the critical field $H_c$. (This property is the Meissner effect). For $H > H_c$, on the other hand, the type I superconductor loses all of its superconducting properties. Accordingly, the invention usefully maintains the type I superconductor bearing below the critical field $H_c$. Type I superconductors are characterized as soft (in contrast to the hard type II superconductors), and include all elemental superconductors except vanadium and niobium.

Type II superconductors, in contrast to the type I superconductors, do not make a direct transition from the normal to the superconducting state. A type II superconductor exhibits the complete Meissner effect only below a lower critical magnetization field $H_{c1}$. Between $H_{c1}$ and a higher critical magnetization field $H_{c2}$ (that is, $H_{c1} < H < H_{c2}$), the type II superconductor defines a mixed state. The mixed state is an example of an inhomogeneous superconducting phase, and an external magnetic field can penetrate into the bulk of the superconductor. Finally, beyond $H_{c2}$, the type II superconductor no longer exhibits the characteristic superconductivity properties.

As indicated above, type II hard superconductors may be contrasted to the type I soft superconductors. Type II superconductors include superconducting compounds and alloys, for example, a superconducting ceramic comprising a 1-2-3 Y-Ba-Cu oxide. The superconductor transition temperature of this material is in the vicinity of 90K, and has an upper critical magnetization field $H_{c2} >> 100K$ Oe.

For both type I and type II superconductors, the critical magnetization field ($H_c$ for type I, and $H_{c1}$ for type II) for levitation applications is rather low, typically less than several hundred Oersteds. Accordingly, in the present invention, the superconductor bearing preferably comprises a type II superconductor, since $H_{c2}$ can be much higher than $H_{c1}$. Moreover, the type II superconductors are preferred because the magnetic flux penetration and pinning within these superconductors are thought to give rise to a lateral stability in the levitation phenomena, and these capabilities may be absent in the type I superconductors. For both type I and type II superconductors, magnetic flux penetration and pinning may be improved by the selective employment of impurities e.g., the addition of silver or silver oxide impurity compositions to type II superconductors comprising Y-Ba-Cu oxides. Further, the magnetic flux penetration and pinning may be improved by structural and physical techniques e.g., micro-grooving and physically patterning the superconductor in a global or local context. Further details on superconductors, in general, are disclosed in the text by Duzer and Turner, Principles of Superconductive Devices and Circuits, Elsevier, N.Y., 1981, chapters 6 and 8.

As just disclosed, the superconductor bearing preferably comprises a type II superconductor. A preferred type II superconductor bearing is a Y-Ba-Cu oxide, known as the "1-2-3" phase. This composition is preferred because it has a high superconducting transition temperature $T_c$; it exhibits a strong anisotropy of the magnetic and electrical properties; it has a large upper critical field, $H_{c2}$; and it exhibits a substantial Meissner effect and flux pinning in both single crystals and sintered ceramics. The 1-2-3 Y-Ba-Cu oxide is an extreme type II superconductor, and it has a superconducting transition temperature of approximately 90-95K. This high transition temperature has the advantage that a required cryogenic cooling is readily achieved with liquid nitrogen.

It is noted that, while the preferred superconductor bearing is a Y-Ba-Cu oxide, recent work in a Bi-Sr-Ca-Cu oxide system and a Tl-Ba-Ca-Cu oxide system, suggests that these systems may be advantageously employed in the near future. The latter systems realize higher temperature superconducting phases; nevertheless, present uncertainties as to their reproducibility and isolation, for example, suggests the preferred employment of the "traditional" 1-2-3 Y-Ba-Cu oxide.

A preferred process that may be used to prepare 1-2-3 Y-Ba-Cu oxide (as well as the Bi or Tl containing Cu oxides) superconductor powders is now disclosed. Attention is also directed to the flowchart shown in FIG. 1. Accordingly, an aqueous solution containing the Y, Ba, and Cu cations in the required stoichiometric ratio (1:2:3) with a total metal ion concentration of approximately 1 M is prepared. Typically, either the metal chloride or nitrate salts or a mixture is used. The room temperature metal salt solution (pH 2-3) is rapidly added to a vigorously stirred, buffered, cold (5-10° C.) caustic solution (pH 12-13) containing sodium or potassium hydroxide and carbonate in amounts adequate to cause complete precipitation of the metal ions and to maintain the pH 10-11 after the addition is completed. The precipitate is collected by either filtration or centrifugation shortly thereafter, and is thoroughly washed with distilled water to remove residual sodium/potassium and chloride/nitrate ions. Because of the partial solubility of barium hydroxide/carbonate at neutral pH, the pH of the filtrate is monitored, and washing discontinued at pH 10. The washed coprecipitate is dried at 80° C. in air, mechanically ground to a fine powder, and calcined in a stream of dry air or oxygen for six hours at 900°-950° C. The resulting black, friable solid is reground to a black moisture sensitive powder. The powder is cold-pressed (10,000 psig) into pellets which are sintered at 950°-1000° C. in oxygen for 2-12 hr, annealed at 400°-500° C. in oxygen for 6-12 hr, and then slowly cooled to room temperature in oxygen. Samples prepared by this process are all single phase and typically exhibit a temperature (onset) of 90-95K as determined by AC and DC magnetic susceptibility.

Fully dense ceramic superconductor pieces are preferred to obtain the maximum Meissner effect levitation forces. In order to achieve densities greater than the 60-80% of theoretical obtained by firing cold pressed samples as above, hot-pressing techniques preferably are employed. Densities of over 90% can be achieved for 1-2-3 Y-Ba-Cu oxide superconducting ceramics by hot pressing followed by annealing in oxygen. It is possible to further increase the density to greater than 99% of theoretical by hot isostatic pressing (HIP). It is also possible to enhance orientation of the ceramic grains during the densification process. Typically, prolonged oxygen annealing times are required to replace the oxygen lost during HIP.

Continuing, and as summarized above, the bearing system of the present invention comprises a magnetic rotor that can be positioned so that it can levitate and move with respect to the superconductor bearing. The magnetic rotor may comprise any permanent magnet material, or an electromagnet. Preferably, the magnetic rotor comprises a permanent magnet, in particular, a rare earth and transition metal based "supermagnet", although conventional ferrites or alnico magnets can be used.

The rare earth permanent magnetic rotor preferably has a high coercivity or high energy product of at least 1 MG Oe, and desirably at least 5 MG Oe. Such a magnet can be provided by way of a sintering or melt-spinning process. Preferred magnets comprising a Sm-Co composition can be manufactured by the sintering process, for example, while magnets comprising a Nd-Fe-B alloy can be manufactured by the sintering or melt-spinning process. Further details on these processes are provided by M. Sagawa et al., J. Appl. Phys., 55, p.2083 (1984) and J. J. Croat, IEEE Trans. Magn. MAG-1, p.1442 (1982). The disclosure of each of these references is incorporated by reference herein.

The permanent magnet is magnetized in a desired magnetic-pole configuration in accordance with a particular application design. For example, the magnetization of a single continuous magnetic rotor may be isotropic or anisotropic, and have a multi-faceted, multiple pole-pair pattern, as disclosed above. Working examples that illustrate the concept are disclosed below.

EXAMPLE

A bearing system comprising a superconductor bearing and a magnetic rotor, was made in the following way.

SUPERCONDUCTOR BEARING

A superconductor bearing 10(FIG. 3A) was prepared in accordance with the disclosure above. The superconductor bearing comprised a high temperature type II superconducting ceramic material $Y\ Ba_2\ Cu_3\ O_7$. The superconductor transition temperature was in the vicinity of 90K, so that it could maintain its superconductivity in liquid nitrogen (boiling point at 77K). The superconductor bearing had a critical magnetization field $H_{c2} >> 100K$ Oe. The superconductor bearing was in the form of a disk generally planar of diameter roughly 29 mm and thickness 4.5 mm. It had a slight curvature of the upper surface, amounting to a depth of roughly 0.7 mm in the center. It was theorized that such a curved shape enhanced the lateral stability of a magnetic rotor, levitating above it and facing its concave surface.

MAGNETIC ROTOR

Four magnetic rotors 11, 12, 13, and 14 were prepared, as shown in FIGS. 2A-D. Each of the magnetic rotors comprised Nd-Fe-B alloy, and the magnetization lay along their thickness. The magnetic rotors 11, 12 and 13 were epoxy bonded Nd-Fe-B isotropic magnets, made in the shape of a flat donut. The flat donut had an outside diameter of 20.5 mm, inside diameter of 8.7 mm, and thickness of 1.7 mm. The remanence Br and intrinsic coercivity $H_{ci}$ of these magnets was approximately 6 KG and 14 KOe, respectively. Each of the three magnets 11, 12, 13 was magnetized with a different pole configuration. The first magnet 11 (FIG. 2A) was a dipole magnet having a north-pole (N) on one surface and a south-pole (S) on an opposite surface. The second magnet 12 (FIG. 2B) was an eight pole-pair magnet with eight alternating, angularly spaced pole sectors on each surface, each sector subtending an angle of approximately 45° at the center of the donut. The third magnet 13 (FIG. 2C) was a five pole-pair magnet with five alternating pole rings concentric to each other and to the circumferential boundry of the magnet. The fourth magnet 14 (FIG. 2D) was a sintered anisotropic Nd-Fe-B magnet with $Br \cong 11.6$ KG and $H_{ci} \cong 10.8$ KOe. The fourth magnet 14 was a five pole-pair rectangular magnet with five alternating pole strips parallel to the long sides perpendicular of the rectangle to the short sides (see FIG. 2D).

BEARING SYSTEM

Figure 3A:
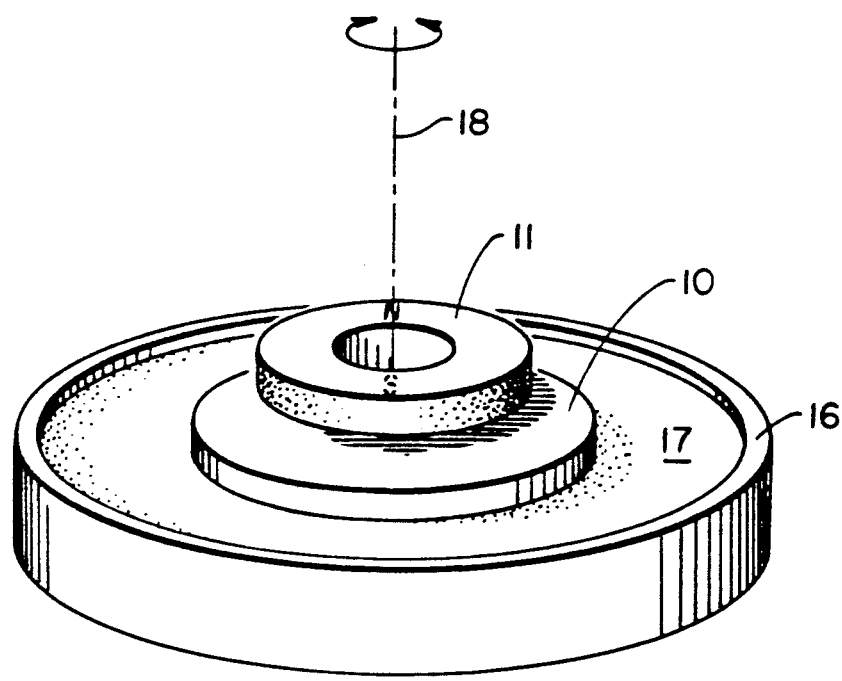
FIGS. 3A-D show, respectively, the application of each of the rotors of FIGS. 2A-D in a bearing system of the invention.

A bearing system 10 was assembled in accordance with the Example, above system. The bearing system 10 carried a load which comprised a mirror (not shown) mounted on the magnetic rotor opposite the bearing. The superconductor bearing 10 composed $Y\ Ba_2\ Cu_3\ O_7$, and was submerged in a quartz petri dish 16 containing liquid nitrogen 17 as shown in FIG. 3A. Each of the four magnetic rotors 11, 12, 13, 14, in turn, was placed above the superconductor bearing 10, as shown in FIGS. 3A-D. The bearing system required that the magnetic field developed between a magnetic rotor and the superconductor bearing, vary with the movement of the magnetic rotor. This magnetic field variation, in turn, should induce a torque-angular displacement graph, as shown in FIG. 4. The results were as follows:

EXPERIMENT I

The first magnetic rotor 11(FIG. 2A), comprising the dipole north-south poles on opposite surfaces, was placed about 2 or 3 mm above the superconductor bearing (see FIG. 3A). A modified Brookfield lab viscometer was employed in order to quantitatively measure the amount of torque required to rotate the magnetic rotor 11 above the superconductor bearing, at a steady speed of 0.6 rpm. FIG. 4 indicates that the dipole magnetic rotor experienced a minimal torque between 1 and 8 dyne-cm, when rotated around its geometrical axis 18.

EXPERIMENT II

Figure 3B:
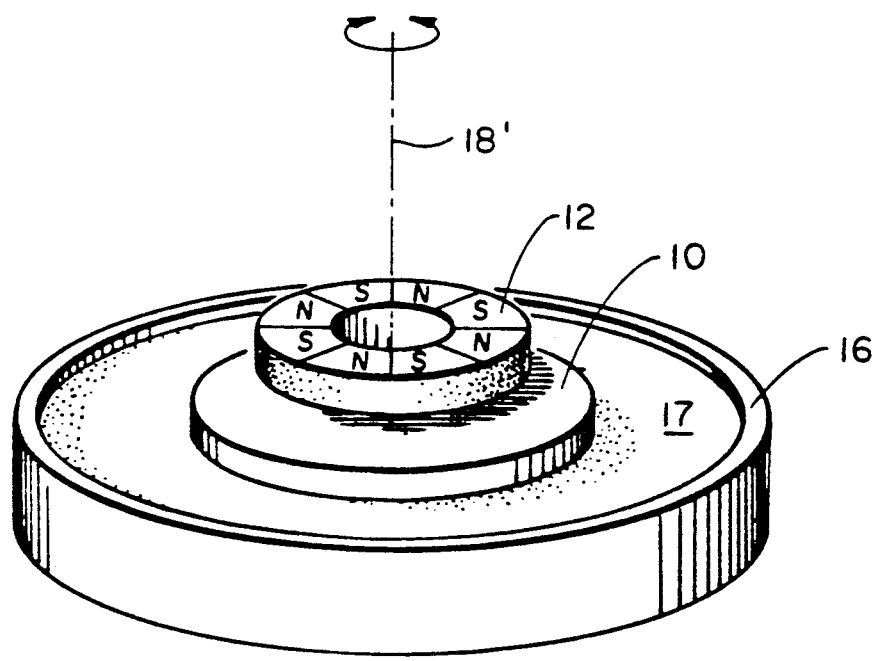
Figure 4:
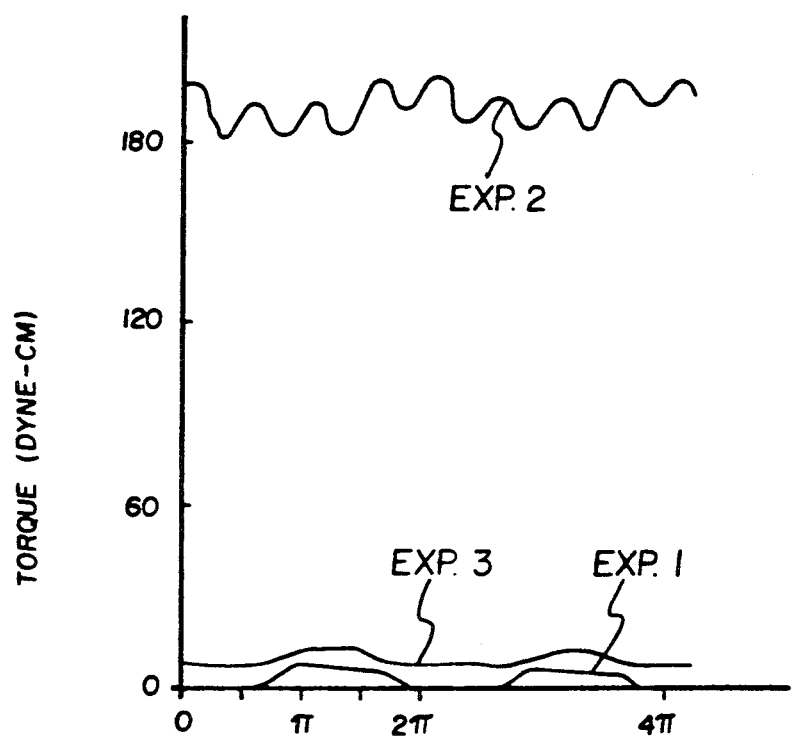
FIG. 4 is a plot of Torque vs Angular Displacement, derived from an Example of the present invention.

The second magnetic rotor 12(FIG. 2B), comprising the light pole-pair magnet, was positioned in place of the first magnetic rotor 11, and the first experiment was repeated (see FIG. 3B). FIG. 4 indicates that the torque was increased significantly to 182 and 204 dyne-cm when rotated around its geometrical axis 18'. Moreover, FIG. 4 charts the case where the superconductor bearing-magnetic rotor gap was 6 mm.

EXPERIMENT III

Figure 3C:
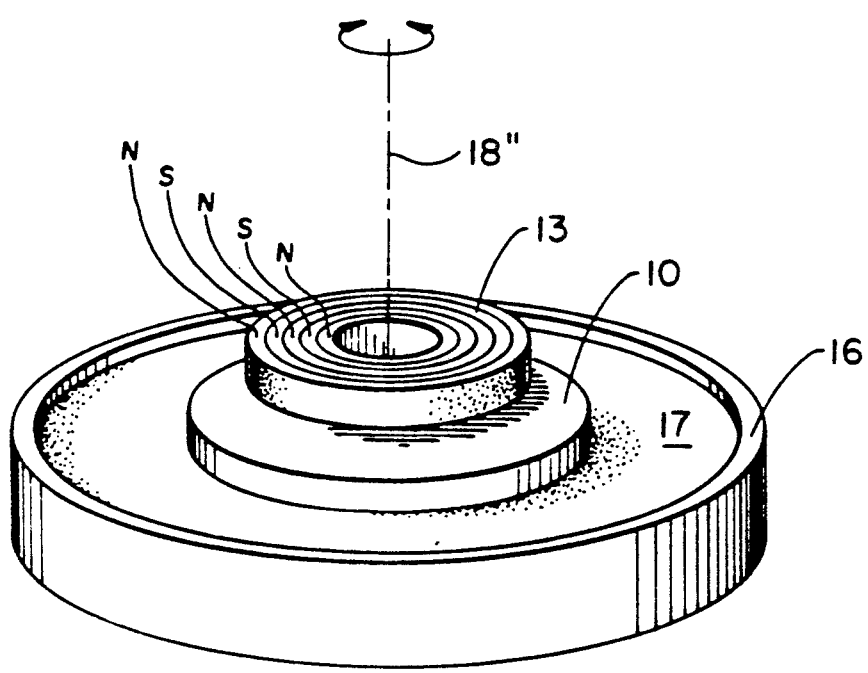

Next, the third magnetic rotor 13(FIG. 2C), comprising the concentric five pole-pair magnet, was positioned 3 mm above the superconductor bearing 10(see FIG. 3C). FIG. 4 indicates that this magnetic rotor experienced a minimal torque when rotated around its geometrical axis 18.

Experiment III helps explain a requirement of the bearing system of the invention, namely, that a variation in the magnetic field in the direction of movement of the rotor is a relative minimum, as sensed by the bearing, and a variation in the magnetic field in all other directions is relatively greater than this minimum, as sensed by the bearing. Restated, at any arbitrarily chosen location of the bearing, the symmetry of the magnetic field lines emanating from the rotor is substantially invariant in time during the course of the rotor's angular movement, as sensed by the bearing; hence, the bearing senses a relative minimum change in magnetic flux. This correlates with a minimum bearing system stiffness in the direction of the rotor's rotation. Note, moreover, that if the rotor/bearing is given any other relative motion, then the bearing, at any arbitrary location of the bearing, senses a net magnetic flux change which is quantitatively greater than the aforementioned minimum. This last situation, in turn, correlates with the bearing system having a larger stiffness, and therefore provides a constraint to move the rotor in the desired direction only.

EXPERIMENT IV

Figure 3D:
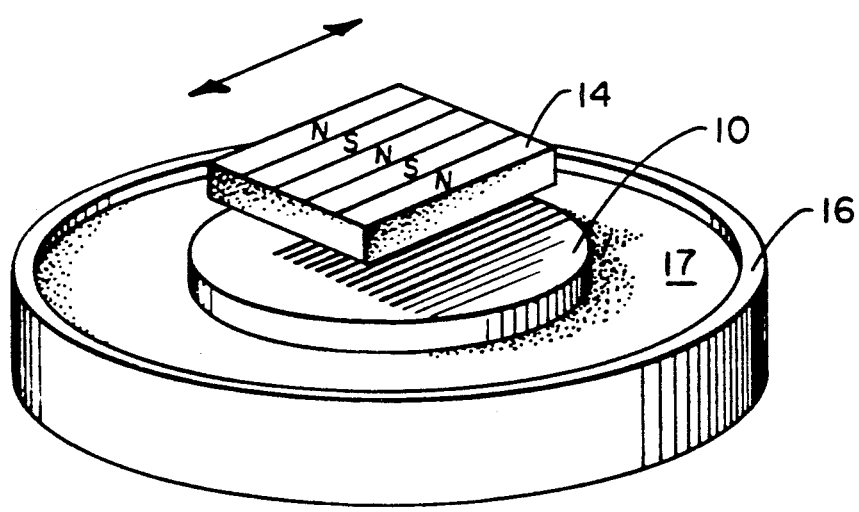

Finally, the fourth magnetic rotor 14(FIG. 2D), comprising the five pole-pair rectangular magnet, was placed above the superconducting bearing 10(see FIG. 3D). The fourth magnetic rotor was designed to study the stiffness and drag force in the translational motion of the levitating magnetic rotor. It was found that a larger force was required to move this magnetic rotor perpendicular to the pole strip, compared to parallel to them.

ANALYSIS OF EXPERIMENTS

The bearing system of the present invention requires that the magnetic field developed between the superconductor bearing and the magnetic rotor vary as defined above in the Summary of the Invention. The Experiments suggest that the magnetic field variations could be realized by way of non-symmetrical magnetic field configurations, whereas, the magnetic field variations could not appreciably develop by way of symmetrical magnetic field configurations. In particular, the pole-pattern geometries used in the Experiments I, III and IV induced symmetrical magnetic field configurations in the direction of motion of the rotor, while the pole-pattern geometries used in the Experiment II induced a non-symmetrical magnetic field configuration in the direction of motion of the rotor. Restated, the superconductor bearing did not see any appreciable change of magnetic (flux) field, and the trapped flux lines within the superconductor bearing did not experience any appreciable force to unpin them, in the symmetrical geometries. Since this "pinning potential" was theorized to be a cause of stiffness and restoring force, the Experiments I, III and IV did not manifest an appreciable torque/force resisting the rotation/translation of the magnetic rotors of these cases. In sharp contrast, however, the Experiment II, employing a non-symmetrical pole-pattern geometry, did induce the required variation of magnetic field between the superconductor bearing and the magnetic rotor. Experiment II, accordingly, developed a very appreciable torque curve.

I claim:

1. A bearing system, comprising:

a bearing having a generally planar surface, and comprising a material exhibiting a superconducting phase below a transition temperature $T_c$ and exhibiting at least a partial Meissner effect under an applied magnetic field of strength less than a critical field $H_c$;

means maintaining the material at a temperature less than $T_c$;

a magnetic rotor, comprising a ferrite composition, positioned above the surface, and having a magnetization pattern corresponding to at least two adjacently positioned, alternating opposite north-south pole-pairs, each pole-pair having its north-south magnetization oriented perpendicular to the surface; the magnetization pattern defining a rotor magnetic field of strength less than said $H_c$ which induces in the material a repulsive force levitating the rotor above the bearing and causing a flux pinning interaction between the rotor and the bearing; the rotor magnetic field being symmetrical relative to at least one direction parallel to the surface and being asymmetrical relative to other directions parallel to the surface, so that application of external force to move the rotor in said at least one direction will be met by relatively little resistance, but the application of external force to move the rotor in said other directions will be met by relatively large resistance.

2. A bearing system as set forth in claim 1, wherein the bearing comprises a type I material.

3. A bearing system as set forth in claim 1, wherein the bearing comprises a type II material.

4. A bearing system as set forth in claim 1, wherein the bearing comprises a ceramic material.

5. A bearing system as set forth in claim 1, wherein the superconductor bearing has a transition temperature of at least 77° K.

6. A bearing system as set forth in claim 1, wherein the bearing is a disc.

7. A bearing system as set forth in claim 6, wherein the surface of the disc has a center with a slight concave curvature for enhancing levitation stability of the magnetic rotor with respect to the disc.

8. A bearing system as set forth in claim 4, wherein the ceramic material comprises a Y-Ba-Cu oxide composition.

9. A bearing system as set forth in claim 8, wherein the ceramic material is a composition comprising a 1-2-3-Y-Ba-Cu Oxide.

10. A bearing system as set forth in claim 9, wherein said at least one direction is a direction of rotation about an axis.

11. A bearing system as set forth in claim 10, wherein the magnetic rotor is of a flat donut shape having a circumferential boundary, and the pole-pairs comprise alternating pole rings concentric to each other and to the boundary.

12. A bearing system as set forth in claim 9, wherein said at least one direction corresponds to a direction of translation.

13. A bearing system as set forth in claim 1, wherein the magnetic rotor has a rectangular shape.

* * * * *